Dec. 28, 1943.  O. W. HOSKING  2,337,556
CABLE
Filed Feb. 3, 1939
Fig. 1  Fig. 2 
Fig. 5  Fig. 6 
Fig. 7 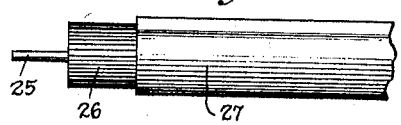 Fig. 8 
Fig. 9 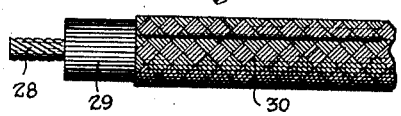 Fig. 10 
Fig. 11 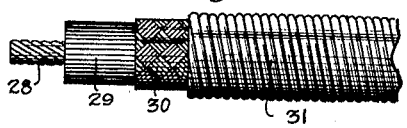 Fig. 12 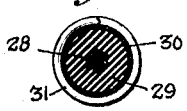
Fig. 13 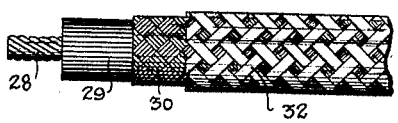 Fig. 14 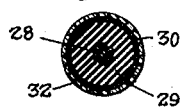
Fig. 15 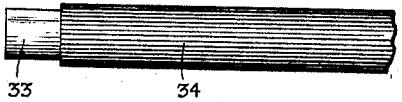 Fig. 16 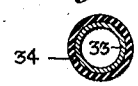
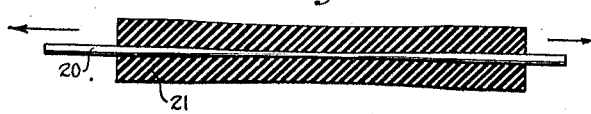
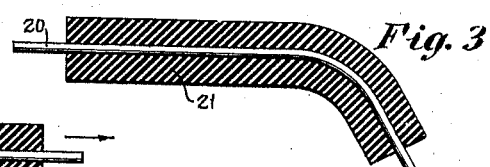
INVENTOR
Oakley W Hosking
BY
ATTORNEY

Patented Dec. 28, 1943

2,337,556

UNITED STATES PATENT OFFICE 2,337,556

CABLE

Oakley W. Hosking, Monroe, N. Y., assignor to Composite Rubber Products Corporation, Bridgeport, Conn., a corporation of Connecticut Application February 3, 1939, Serial No. 254,413

17 Claims. (Cl. 174—102)

This invention relates to wire and like forms, and more especially to rubber covered wire or similar forms, including particularly insulated electric cables.

It is the practice, in covering wires for electrical and other purposes where a tenacious covering is desired, to mold or vulcanize a continuous rubber coating about the wire so that it is in intimate physical contact with the same. This is especially true where it is desired that the wire and the covering therefor function mechanically as much like a single integral unit as possible.

The advantages of such a structure have long been recognized, yet, so far as I am able to determine, there has never been attained a perfect bond between the wire and the rubber covering of same to permit the covered wire to be bent into various shapes, or pulled, twisted, or otherwise deformed, without effecting a separation between the wire surface and the covering, at the points of greatest stress.

Such separations, minute though they may be, impair the tenacity and effectiveness of the covering from both the mechanical and electrical standpoints. If the covered wire form functions purely as a mechanical structure, the points of impaired adhesion present weaknesses in that the resilient covering is subject to creeping, wrinkling, and other undesirable defects, occurring due to the backing being nonadherent. If the covered wire form functions as an electrical unit, the weakened points are liable to electrical insulation breakdown, either from mechanical or electrical stress. In addition, the points of impaired adhesion may age more quickly than otherwise due to the presence of air under the covering, and, if the electrical energy of the circuit is of a certain type, corona may form at these points between the wire surface and the inner surface of the covering, causing rapid deterioration of the latter and ultimate electrical breakdown.

In the case of electrical cables, it is sometimes necessary to pull a length through a more or less tortuous conduit, and this results in impaired adhesion between the wire and covering, due either to attenuation of the wire, or to the force applied to the covering, or to both. Where long stretches of covered wire are strung in the air, as between posts or towers, there is also the possibility of attenuation resulting from unusual ice loads, high winds, shifting of supports, and other causes including temperature changes, and this causes impairment of the bond between the wire surface and the adjacent rubber covering. An unnecessarily rapid deterioration of the covering follows, especially if conditions are such that corona forms around the wire.

I have found that it is possible to secure a perfect mechanical bond between the wire and its rubber covering, thus obviating the above disadvantages, if the surface of the wire consists of clean, preferably smooth and polished, Monel metal. The wire may be entirely of Monel metal, or may have a core of copper, steel, brass, or other material, or it may be in the form of tubing.

While "Monel" is a trade-mark, it is used herein in the sense defined by the dictionaries, that is, as an alloy comprising "approximately 67 per cent of nickel, 28 of copper, and 5 of other elements, chiefly iron and manganese, made by direct reduction from ore in which the constituent metals occur in these proportions." I have found that an alloy having the constituent metals ir the percentages mentioned above is most applicable for use in my process.

I have discovered that uncured, partially cured, or cured rubber coating substance may be made to permanently adhere to the Monel metal surface by bringing the two together under heat and pressure, and that the bond between the wire and the rubber coating is greater than the cohesion between the molecules of the rubber. This broadly is described and claimed in my copending application Serial No. 234,616, filed October 12, 1938. The adhesion between the contacting surfaces of the wire and rubber is so great that a destructive force will cause the rubber to tear apart within itself rather than separate from the Monel metal.

I have also found that the strong bond between the wire and the rubber coating depends on the Monel metal surface of the wire being smooth and bright, and that when the surface is rough, or unclean, the union between the metal and rubber is impaired.

I have determined experimentally that the same rubber substance which unites so perfectly with the Monel metal surface of the wire will not bond with wire made from common metals such as nickel, copper, iron, or alloys such as steel, brass, and bronze without the intermediary of a cementitious rubber coating, being first applied to the wire, or without roughening the surface of the wire. Moreover, the bond obtained between rubber and any of these latter metals will not be as perfect as it is with Monel metal.

I have discovered that if a wire of metal other than Monel is thinly electroplated in the usual manner with Monel metal as the other electrode, or with commercially pure nickel, the surface characteristics of the plating appear to be such as to impair the union between the rubber and the plated metal, unless the latter is first provided with a thin film of rubber cement.

Other features and advantages will hereinafter appear.

In the drawing—

Figure 1 is a side view of a length of solid Monel wire having a rubber covering, made according to the invention.

Fig. 2 is a cross-section of the wire of Fig. 1.

Fig. 3 is a longitudinal section of a bent length of wire.

Fig. 4 is a longitudinal section of a straight wire which has been lengthened or attenuated by a pulling force.

Fig. 5 is a side view of a length of stranded Monel wire with cotton and braid covering.

Fig. 6 is a cross-section of the wire of Fig. 5.

Fig. 7 is a side view of a solid rubber covered Monel wire having a tubular Monel metal shield around the covering.

Fig. 8 is a cross-section of the wire of Fig. 7.

Fig. 9 is a side view of a stranded Monel wire with rubber covering, and Monel wire braid.

Fig. 10 is a cross-section of the wire of Fig. 9.

Fig. 11 is a side view of a stranded Monel wire with rubber covering, Monel wire braid, and spiral wound ribbon armor.

Fig. 12 is a cross-section of the wire of Fig. 11.

Fig. 13 is a side view of a stranded Monel wire with rubber covering, Monel wire braid, and metal ribbon armor.

Fig. 14 is a cross-section of the wire of Fig. 13.

Fig. 15 is a side view of a tubular Monel wire having a rubber covering.

Fig. 16 is a cross-section of the tubular wire of Fig. 15.

In the accompanying drawing, the successive coverings of the wire are shown as being cut back from the wire end for the purpose of clarity.

Referring to Figs. 1 and 2, there is shown a wire 20 having an outer cylindrical surface of smooth, bright Monel metal. Where conditions warrant it, the wire may be made entirely of Monel, or it may be made of a copper, brass, steel, or other core, with the Monel metal providing the exterior surface. In either case, in practicing the invention, the Monel exterior is cleaned and polished so as to be free of dirt and foreign matter, corrosion oxides, etc. A rubber coating 21 is provided about the wire 20 under conditions of heat and pressure, as by molding, and by this operation the rubber substance becomes vulcanized and at the same time firmly bonded to the surface of the wire.

I have previously set out the percentages as given by the leading dictionaries of the English language of the constituent metals of which the alloy, marketed under the trade name of "Monel," is formed. This definition is very similar to the published analysis of "Monel" as given by the exclusive producers thereof, the International Nickel Corporation. The analysis given by the producers of the alloy is as follows:

| | Per cent |
|---|---|
| Nickel | 68 |
| Copper | 29 |
| Iron | 1.6 |
| Manganese | 1.0 |
| Silicon | 0.10 |
| Carbon | 0.15 |
| Sulphur | 0.005 |

Throughout the specification where I mentioned Monel metal, I am referring to the alloy embraced within the definition given by the dictionaries set out hereinbefore.

The rubber may be in a crude plasticized form as it is placed about the wire, the formation and curing of the coating taking place as it is made to adhere to the wire surface. It should be noted that the rubber coating 21 is not held in place about the wire 20 merely by virtue of its surrounding same, but that a strong inseparable bond exists between the rubber and the clean polished Monel surface of the wire. This bond, when properly accomplished, is so powerful that the wire cannot be removed from the coating unless the latter is torn to shreds.

I have found that best results are obtained when the pressure to the coating is applied gradually, to avoid excessive friction between the rubber and the Monel surface of the wire while the coating is being formed to shape. Thereafter the pressure is maintained constant during the curing of the rubber and the bonding of same to the wire surface. Preferably, the wire 20 is preheated to prepare it for receiving the coating 21.

It is not necessary, according to the invention, that the rubber substance be in plasticized form for coating on the wire. It may be precured or partially cured in a separate press, and then placed with the wire in another press for the bonding. When this is done, it is necessary merely to bring the rubber and wire together under heat and pressure, and without the intermediary of any other material or substance, to effect a strong bond.

The time required for the bonding operation depends upon whether the rubber substance being applied is in crude, semicured, or cured form, the degree to which same has been preheated, the heat of the molds or presses, and the pressure brought to bear against the coating. When the rubber is precured or semicured, the bonding operation may be completed, approximately, in from three to fifteen minutes, depending on conditions as above.

An important feature of the invention is that the rubber may be bonded to the surface of the wire by processes similar to those of vulcanizing rubber to rubber, and actually while the rubber is being cured.

It will be readily seen that wire and wire forms made according to the present invention possess many advantages. From the mechanical standpoint, the covering is tough and durable due to its strong adhesion to the wire surface, which acts as a backing. Bending of the wire, twisting, etc., will not alter the strength of the covering, which cannot creep, wrinkle, or shear under twisting stress, without failure of the wire itself. If the wire is bent, as in Fig. 3, the rubber covering will not tend to thicken at the inside of the bend and to thin out at the outside as much as if perfect adhesion were not present. Bending will not impair the adhesion between the covering and the wire. Considering electrical insulation, the covering will always present an unbroken wall between the wire and exterior objects. Since there can be no points of impaired adhesion, corona will not occur when using the wire in high voltage or high frequency circuits, and, therefore, the life of the rubber covering will not be unnecessarily shortened. If the wire is strained by a strong pull so that it attenuates, as in Fig. 4, the rubber will still adhere to the wire and follow the attenuation thereof, as illustrated.

According to the present invention, it is not necessary that the entire thickness of rubber coating, as shown in Figs. 1 and 2, be provided about the wire at one time. If desired, the wire may be given a much thinner coating at first, and the additional rubber applied and vulcanized to the initial coating at a later time. In this way, a thinly rubber-coated wire may be manufactured as a standard item, and various types and sizes of additional coating and armoring applied at a later time.

An important advantage of the invention is that Monel metal has great tensile strength, can be readily worked, is substantially noncorrosive, tough, and wear resisting.

I have also discovered that rubber and rubber substance may be coated on and bonded to wire of some suitable metal other than nickel or Monel metal, having a surface of commercially pure nickel, or a surface produced by electroplating with Monel metal in the usual manner, if an intermediary substance is employed. This intermediary substance can be a thin film of vulcanizable rubber cement coated on the wire; a strong bond will be effected when rubber substance is applied under heat and pressure.

Contrary to expectations, I have found that if the Monel surface of the wire is finely serrated, or rough, the adhesion between the rubber and the metal is impaired. It is my belief that this explains the aforementioned difficulty in securing a strong bond between the rubber and wire electroplated with Monel metal, without the use of an intermediary substance, such as rubber cement, inasmuch as wire having a plated surface seems to present innumerable minute depressions which when contacted by the rubber substance, retain air or gases to defeat the bonding. By applying a film of vulcanizable rubber solution, the gases are kept out of these cavities, and a perfect bond results. Accordingly, wherever the wire surface is such as to present gas-trapping cavities, I prefer to coat the surface with the thin vulcanizable rubber solution.

Figs. 5 and 6 show a stranded Monel wire 22, each strand of which has a strong inseparable bond with the rubber covering 23. A cotton braid 24 is shown about the rubber to provide a more rugged exterior therefor. The present invention is of particular advantage when used with stranded wires, which are more flexible than solid wires and more subject to bending.

Figs. 7 and 8 show a semirigid shielded conductor. A Monel wire 25 is bonded in a rubber covering 26 which in turn is bonded to an encircling Monel sleeve 27 which can be both an electrical and mechanical shield. For shielded high tension circuits, such a conductor and conduit assembly is of particular use in preventing corona and consequent insulation breakdown.

A more flexible shielded cable is illustrated in Figs. 9 and 10, where a stranded Monel wire 28 is covered with and bonded to rubber insulation 29. This is in turn covered with and bonded to Monel wire braid 30 by the application of additional heat and pressure. Protection in electrical circuits is high due to the strong adhesion between the rubber and the wires, as already pointed out.

If desired, a further armoring may be added, as in Figs. 11 and 12, by wrapping the shielded wire with spirally wound metal ribbon 31.

Figs. 13 and 14 show an armored shielded cable similar to that of Figs. 9 and 10, but with the addition of a metal ribbon braid 32 serving as an armor.

A hollow conductor 33 of Monel metal tubing is shown in Figs. 15 and 16, covered by a rubber coating 34 adhering to the exterior surface of the tubing. Where the diameter of the conductor is appreciably large, the advantages of perfect adhesion are also evident in providing a tough insulating covering of long life and service.

Throughout the specification where I have mentioned rubber or rubber-like substance, I intend these terms to include all caoutchouc, derivatives thereof, and substitutes therefor which are vulcanizable.

Variations and modifications may be made within the scope of this invention and portions of the improvements may be used without others.

I claim:

1. A wire form comprising a wire having a surface of Monel metal, free of gas-occluding cavities, with a coating of vulcanized rubber substance directly bonded to said surface.

2. A wire form comprising a Monel metal wire, the surface of which is free of gas-occluding cavities, with vulcanized rubber substance directly bonded to the exterior thereof.

3. A cable comprising a wire having a surface of Monel metal, free of gas-occluding cavities, and a uniform coating of vulcanized rubber substance directly bonded to said surface; and a Monel wire braid around the uniform coating and in contact therewith, the surfaces of the wires being similarly free of gas-occluding cavities and the coating being directly bonded to the braid.

4. A cable comprising a Monel metal wire, the surface of which is free of gas-occluding cavities, with a uniform coating of vulcanized rubber substance directly bonded to the exterior thereof; and a Monel metal tube having a surface likewise free of gas-occluding cavities surrounding the rubber coating and in contact therewith, the coating being directly bonded to the tube.

5. A cable comprising a plurality of strands of wire, each having a surface of Monel metal which is free of gas-occluding cavities; and a vulcanized rubber coating encircling the wire strands and directly bonded thereto.

6. A cable comprising a Monel metal tube having a continuously smooth, polished surface and a coating of vulcanized rubber substance directly bonded to the exterior thereof.

7. A cable comprising a wire having a continuously smooth, polished surface of Monel metal with a coating of vulcanized rubber substance directly bonded to said surface.

8. A cable comprising a wire having a continuously smooth, polished surface of Monel metal with a uniform coating of vulcanized rubber substance directly bonded to the exterior thereof; a braid of continuously smooth, polished Monel wire around the uniform coating and in contact therewith, the coating being vulcanized directly to the braid; and a second metal braid encircling the first and in contact therewith.

9. A rod-like form comprising an elongate metal member of uniform cross-section having an exterior surface of Monel metal, free of gas-occluding cavities; and a coating of rubber substance vulcanized directly to the Monel metal surface and adhering thereto.

10. A rod-like form comprising an elongate Monel metal member of uniform cross-section having a continuously smooth, polished exterior surface; and a coating of rubber substance vulcanized directly to the Monel metal surface and adhering thereto.

11. A rod-like form comprising an elongate tubular Monel metal member of uniform cross-section having a continuously smooth, polished exterior surface; and a uniform covering of rubber vulcanized to the polished Monel metal surface and adhering thereto.

12. A rod-like form comprising an elongate tubular Monel metal member of uniform cross-section having a continuously smooth, polished inner surface; a second elongate Monel metal member having a continuously smooth, polished outer surface, disposed within the first and spaced therefrom; and a rubber substance occupying the space between the members, vulcanized and directly bonded to same.

13. A cable comprising a plurality of strands of Monel metal wire, each having a continuously smooth, polished surface; a rubber coating encircling the wire strands and vulcanized directly thereto; and a braid of continuously smooth, polished Monel wire around the coating and vulcanized directly thereto, said braid being spaced from the wire strands.

14. A cable comprising a plurality of strands of Monel metal wire, each having a continuously smooth, polished surface; a rubber coating encircling the wire strands and vulcanized directly thereto; a braid of continuously smooth, polished Monel metal around the coating and vulcanized directly thereto, said braid being spaced from the wire strands; and a second braid encircling the first and in contact therewith.

15. The method of making insulated rod-like members which comprises providing the members with a continuously smooth, polished Monel metal surface, and vulcanizing a rubber substance directly to said surface to form a coating therefor.

16. The method of making a wire cable which comprises providing a wire having a continuous Monel surface; polishing the wire to provide a clean, continuously smooth, polished surface; precuring a rubber substance; and bonding said precured rubber substance directly to said smooth polished Monel metal surface under simultaneous application of heat and pressure to form a coating therefor.

17. The method of making an insulated rod-like member which comprises providing the member with a continuously smooth, polished Monel metal surface, surrounding said surface with rubber and bonding said rubber directly thereto by application of heat and pressure.

OAKLEY W. HOSKING.